(12) United States Patent
Surcouf et al.

(10) Patent No.: US 10,848,802 B2
(45) Date of Patent: Nov. 24, 2020

(54) IP TRAFFIC SOFTWARE HIGH PRECISION PACER

(71) Applicant: Cisco Technology, Inc., San Jose, CA (US)

(72) Inventors: Andre Surcouf, St Leu la Foret (FR); Mohammed Hawari, Montigny-le-Bretonneux (FR); Pierre Pfister, Angers (FR); Axel Taldir, St Germain les Arpajon (FR)

(73) Assignee: Cisco Technology, Inc., San Jose, CA (US)

( * ) Notice: Subject to any disclaimer, the term of this patent is extended or adjusted under 35 U.S.C. 154(b) by 44 days.

(21) Appl. No.: 15/917,298

(22) Filed: Mar. 9, 2018

(65) Prior Publication Data

US 2019/0082204 A1    Mar. 14, 2019

Related U.S. Application Data

(60) Provisional application No. 62/557,843, filed on Sep. 13, 2017.

(51) Int. Cl.

| | | |
|---|---|---|
| *H04N 21/238* | (2011.01) | |
| *H04N 21/643* | (2011.01) | |
| *H04N 21/24* | (2011.01) | |
| *H04N 21/2343* | (2011.01) | |
| *H04L 29/06* | (2006.01) | |
| *H04N 21/236* | (2011.01) | |
| *H04L 29/08* | (2006.01) | |

(52) U.S. Cl.
CPC ..... *H04N 21/23805* (2013.01); *H04L 65/605* (2013.01); *H04L 65/80* (2013.01); *H04L 67/2823* (2013.01); *H04N 21/23611* (2013.01); *H04N 21/234381* (2013.01); *H04N 21/2402* (2013.01); *H04N 21/64322* (2013.01)

(58) Field of Classification Search
CPC ....... H04N 21/23805; H04N 21/64322; H04N 21/2402; H04N 21/23611; H04N 21/234381; H04L 65/80; H04L 65/605; H04L 67/2823
See application file for complete search history.

(56) References Cited

U.S. PATENT DOCUMENTS

| | | | |
|---|---|---|---|
| 5,535,216 A  * | 7/1996 | Goldman | H04J 3/0632 327/144 |
| 5,586,264 A | 12/1996 | Belknap et al. | |
| 5,805,821 A | 9/1998 | Saxena et al. | |
| 5,856,975 A | 1/1999 | Rostoker et al. | |
| 6,865,188 B1 * | 3/2005 | Stirling | H04L 12/43 370/460 |

(Continued)

*Primary Examiner* — Jianye Wu
(74) *Attorney, Agent, or Firm* — Patterson + Sheridan, LLP

(57) ABSTRACT

Embodiments provide techniques for delivering a paced stream of video data packets. One embodiment includes receiving a data stream of video data packets formatted according to a Society of Motion Picture and Television Engineers (SMPTE) standard. A desired rate of delivery for the video data packets at a gateway device is determined. Embodiments generate a padded data stream by inserting one or more pause frames in between the video data packets in the received data stream, based on the desired rate of delivery. The padded data stream is transmitted across a link to a network switch, to be transmitted to the gateway device.

19 Claims, 5 Drawing Sheets

(56) References Cited

U.S. PATENT DOCUMENTS

| | | | |
|---|---|---|---|
| 7,023,924 B1* | 4/2006 | Keller | H04N 21/23424 |
| | | | 375/240.26 |
| 2004/0075745 A1 | 4/2004 | Mance et al. | |
| 2005/0169314 A1* | 8/2005 | Beaudoin | H04N 21/2343 |
| | | | 370/480 |
| 2006/0222129 A1* | 10/2006 | Hadzic | H04L 7/0338 |
| | | | 375/355 |
| 2007/0186002 A1* | 8/2007 | Campbell | H04N 7/142 |
| | | | 709/231 |
| 2007/0237185 A1 | 10/2007 | Pereira et al. | |
| 2008/0310630 A1* | 12/2008 | Candelore | H04N 7/1675 |
| | | | 380/217 |
| 2009/0052540 A1* | 2/2009 | Gutman | H04N 21/23439 |
| | | | 375/240.24 |

\* cited by examiner

IP TRAFFIC SOFTWARE HIGH PRECISION PACER

TECHNICAL FIELD

Embodiments presented in this disclosure generally relate to delivering video data packets. More specifically, embodiments disclosed herein relate to techniques for padding a video data stream using pause frames to ensure proper pacing for a gateway device.

BACKGROUND

The video industry largely uses Serial Digital Interface (SDI) equipment for transporting video between appliances. SDI over Internet Protocol (IP) has been defined by the Society of Motion Picture and Television Engineers (SMPTE) standard body. SMPTE 2022-6 is one current standard defining how to transport SDI over IP. SMPTE 2110-21 is another such standard, which defines a narrow profile as well as a wide profile. Generally, the narrow profile (also referred to as the low profile) is intended to be implemented in hardware (e.g., due to hard timing constraints, flat constant bit rate (CBR), etc.), whereas the wide profile (also referred to as the large profile) is intended to be implementable in software (e.g., due to higher jitter tolerance with acceptable very small packet bursts). Both the SMPTE 2022-6 and 2110-21 narrow profile define a CBR with very strict inter packet time interval. While SMPTE 2022-6 does not explicitly define the timing on the wire, SMPTE 2110-21 has a clear definition of the Inter Packet Gap (IPG).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
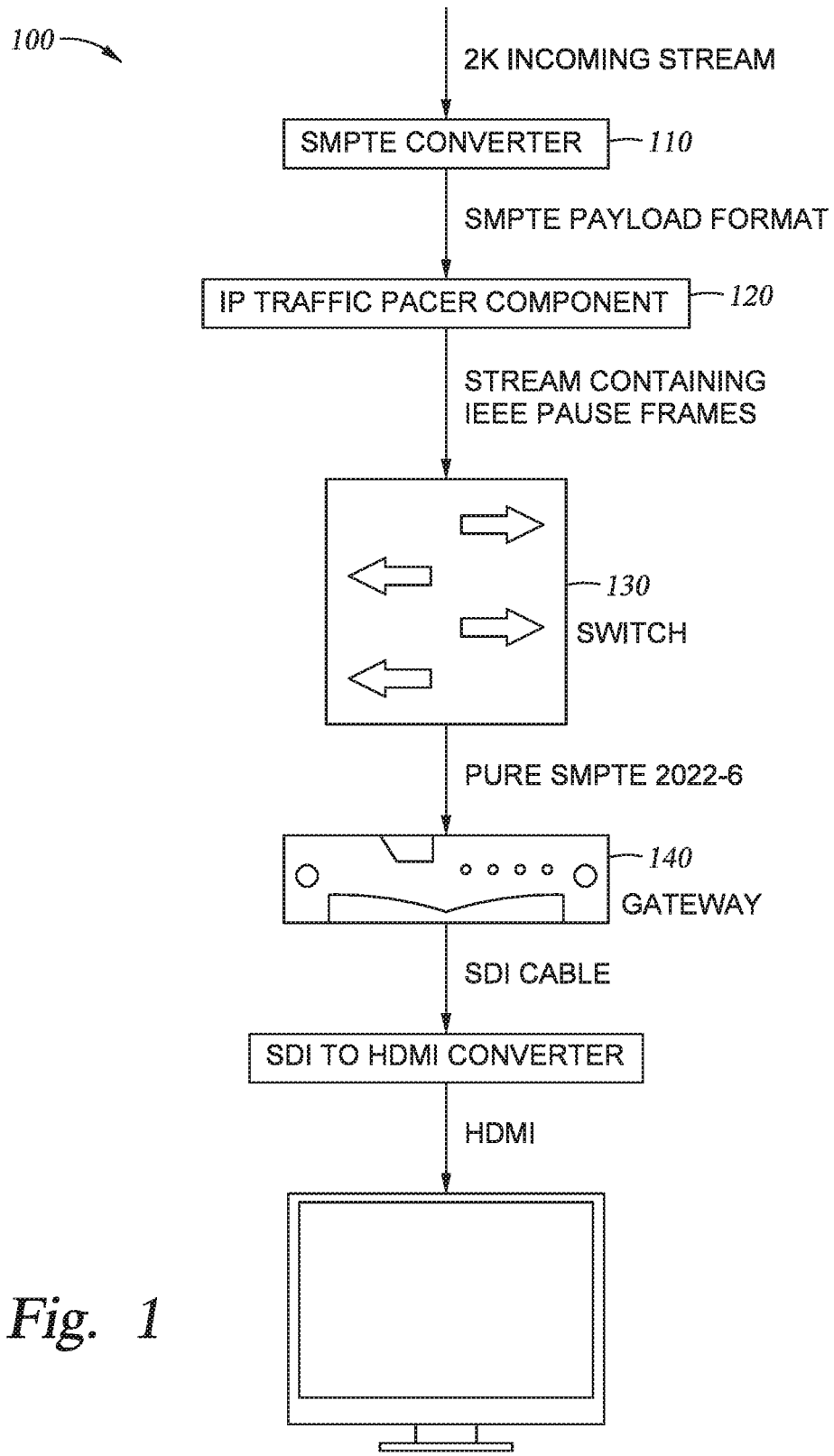
FIG. 1 is a diagram illustrating a system configured with an IP traffic pacer component, according to one embodiment described herein.

One embodiment presented in this disclosure provides a method that includes receiving a data stream of video data packets. The method also includes determining a desired rate of delivery for the video data packets at a gateway device. Additionally, the method includes generating a padded data stream by inserting one or more pause frames in between the video data packets in the received data stream, based on the desired rate of delivery. The method further includes transmitting the padded data stream across a link to a network switch, to be transmitted to the gateway device.

In one aspect, in combination with any example above, the network switch is configured to discard any received pause frames, and wherein the network switch is configured to forward the video data packets to the gateway device.

In one aspect, in combination with any example above, the method further includes determining a measure of bandwidth for the link to the network switch, and determining a number of pause frames to insert between the video data packets in the padded data stream, based on the determined measure of bandwidth.

In one aspect, in combination with any example above, the method further includes determining a size of at least one of the one or more pause frames, based on the desired rate of delivery for the video data packets and the determined measure of bandwidth.

In one aspect, in combination with any example above, the size of a first one of the one or more data packets is greater than the size of a second one of the one or more data packets.

In one aspect, in combination with any example above, the video data packets are formatted according to a Society of Motion Picture and Television Engineers (SMPTE) standard.

In one aspect, in combination with any example above, the SMPTE standard further comprises one of SMPTE 2022-6 and SMPTE 2110-21.

Another embodiment presented in this disclosure provides a method that includes receiving a data stream of video data packets, wherein the video data packets are formatted according to a Society of Motion Picture and Television Engineers (SMPTE) standard. The method also includes determining a desired rate of delivery for the video data packets at a gateway device. The method includes determining a measure of bandwidth for the link to the network switch. Additionally, the method includes determining a number of pause frames to insert between the video data packets in the padded data stream, based on the determined measure of bandwidth. The method further includes determining a size of at least one of the determined number of pause frames, based on the desired rate of delivery for the video data packets and the determined measure of bandwidth. The method also includes generating a padded data stream by inserting the determined number of pause frames of the determined size, between the video data packets in the received data stream, based on the desired rate of delivery. And the method includes transmitting the padded data stream across a link to a network switch, to be transmitted to the gateway device.

Yet another embodiment provides a system that includes a network switch, a gateway device, and an Internet Protocol (IP) traffic pacer component that, when executed, is configured to perform an operation. The operation includes receiving a data stream of video data packets. The operation also includes determining a desired rate of delivery for the video data packets at the gateway device. Additionally, the operation includes generating a padded data stream by inserting one or more pause frames in between the video data packets in the received data stream, based on the desired rate of delivery. The operation further includes transmitting the padded data stream across a link to the network switch, to be transmitted to the gateway device. The network switch is configured to receive the padded data stream across the link, discard pause frames within the padded data stream and transmit the video data packets to the gateway device at the desired rate of delivery. The gateway device is configured to receive the video data packets at the desired rate of delivery and process the received video data packets.

EXAMPLE EMBODIMENTS

The video industry still predominantly uses SDI equipment for transporting video between appliances. The SMPTE standards body provides several standards for defining SDI over IP. For example, SMPTE 2022-6 is one current standard defining how to transport SDI over IP. Likewise, SMPTE 2110-21 is a newer standard that defines a narrow profile as well as a wide profile. The narrow profile is generally intended to be implemented in dedicated hardware, due to its hard timing constraints, flat constant bitrate, and so on. On the other hand, the wide profile may be implemented in software, as the wide profile provides a higher jitter tolerance and considers very small packet bursts to be acceptable. Generally, both the SMPTE 2022-6 and 2110-21 narrow profiles define a constant bit rate stream with very strict inter packet time travel, and while SMPTE 2022-6 does not explicitly define the timing on the wire, SMPTE 2110-21 clearly defines the inter-packet gap.

Generally, SMPTE 2022-6 and 2110-21 narrow profiles are designed to be implemented using dedicated hardware, while the reduced requirements of SMPTE 2110-21 wide profile potentially allow this protocol to be implemented using software solutions. As a consequence, while there are no currently viable software implementations for SMPTE 2022-6 and 2110-21 narrow profile, there are companies providing dedicated and expensive hardware network equipment that support these standards. Moreover, conventional network interface cards (NICs) do not support the timing constraints of the aforementioned SMPTE standards.

As such, embodiments described herein provide a software solution to implement the delivery of SDI video data packets over IP data communications. According to one embodiment described herein, the SMPTE standards for delivering SDI video data packets can be supported by a purely software solution and without the need for any dedicated hardware resources. Accordingly, embodiments described herein can be significantly less expensive to implement than conventional solutions. Moreover, embodiments described herein are significantly more flexible than conventional solutions, as the same hardware can be used to implement various current and future SMPTE standards.

Generally, for a high definition (HD) video, the SDI throughput is approximately 1.485 Gbps. However, transporting an SDI signal over IP uses additional headers (e.g., Real-time Transport Protocol (RTP) headers, IP headers, Ethernet headers, etc.), resulting in a throughput closer to 1.56 Gbps, with a far more precise fractional part. Conventional Ethernet NICs can provide pacing services for data packets, but only by increments of 1 Mbps, making them unsuitable for pacing SDI over IP traffic which has a throughput of approximately 1.485 Gbps. Moreover, the network throughput for SDI data for a 59.94FPS frame rate (which is a current standard frame rate) is not exactly 1.485 Gbps (as such a value is for 60FPS video), but rather would be 1.48351648 Gbps (i.e., 1.485/1.001) corresponding to a 1.591340 Gbps SMPTE stream. As the time interval between SMPTE IP packets is not an even integer multiple of the time to send one byte at 10 Gbps over the Ethernet wire, conventional NIC pacing solutions are not suitable for pacing SDI over IP data.

One embodiment presented in this disclosure provides a method that includes receiving a data stream of video data packets. The method also includes determining a desired rate of delivery for the video data packets at a gateway device. Additionally, the method includes generating a padded data stream by inserting one or more pause frames in between the video data packets in the received data stream, based on the desired rate of delivery. The method further includes transmitting the padded data stream across a link to a network switch, to be transmitted to the gateway device.

Another embodiment presented in this disclosure provides a method that includes receiving a data stream of video data packets, wherein the video data packets are formatted according to a Society of Motion Picture and Television Engineers (SMPTE) standard. The method also includes determining a desired rate of delivery for the video data packets at a gateway device. The method includes determining a measure of bandwidth for the link to the network switch. Additionally, the method includes determining a number of pause frames to insert between the video data packets in the padded data stream, based on the determined measure of bandwidth. The method further includes determining a size of at least one of the determined number of pause frames, based on the desired rate of delivery for the video data packets and the determined measure of bandwidth. The method also includes generating a padded data stream by inserting the determined number of pause frames of the determined size, between the video data packets in the received data stream, based on the desired rate of delivery. And the method includes transmitting the padded data stream across a link to a network switch, to be transmitted to the gateway device.

Yet another embodiment provides a system that includes a network switch, a gateway device, and an IP traffic pacer component that, when executed, is configured to perform an operation. The operation includes receiving a data stream of video data packets. The operation also includes determining a desired rate of delivery for the video data packets at the gateway device. Additionally, the operation includes generating a padded data stream by inserting one or more pause frames in between the video data packets in the received data stream, based on the desired rate of delivery. The operation further includes transmitting the padded data stream across a link to the network switch, to be transmitted to the gateway device. The network switch is configured to receive the padded data stream across the link, discard pause frames within the padded data stream and transmit the video data packets to the gateway device at the desired rate of delivery. The gateway device is configured to receive the video data packets at the desired rate of delivery and process the received video data packets.

FIG. 1 is a diagram illustrating a system configured with an IP traffic pacer component, according to one embodiment described herein. The system 100 includes a network switch 130, a gateway device 140, and an Internet Protocol (IP) traffic pacer component 120. As shown, the system 100 depicts a 2K incoming video stream (e.g., from a video source, such as a video camera), that is converted from an uncompressed media format to an SMPTE data standard for sending SDI data over IP by SMPTE converter 110. In some embodiments, SMPTE converter 110 is a component of the video source device (such as a video camera). The data packets in the SMPTE format are transmitted to the IP traffic pacer component 120. Generally, the IP traffic pacer component 120 represents software executing on one or more computing systems that is configured to control the pace of delivery of the video data packets to the gateway device 140. Moreover, the gateway device 140 is generally configured such that the SMPTE data packets are delivered at a particular rate, and any significant amount of jitter in the delivery of the data packets can result in errors or otherwise undesirable performance.

In one embodiment, upon receiving the stream of video packets in the SMPTE format, the IP traffic pacer component 120 can determine a desired rate of delivery for the video data packets at the gateway device 140. Additionally, the IP traffic pacer component 120 can generate a padded data stream by inserting one or more pause frames in between the video data packets in the received data stream, based on the desired rate of delivery. The IP traffic pacer component 120 could then transmit the padded data stream across a link to the network switch 130, to be transmitted to the gateway device 140. Generally, the IP traffic pacer component 120 can be configured to pad the data stream such that the SMPTE video data packets are delivered at the desired rate, by inserting pause frames into the data stream to saturate the Ethernet link between the IP traffic pacer component 120 and the network switch 130. The network switch 130 could be configured to receive the padded data stream across the link and to discard pause frames within the padded data stream. The network switch 130 could then transmit the video data packets to the gateway device 140 at the desired rate of delivery. The gateway device 140 could receive the video data packets at the desired rate of delivery and process the received video data packets. For example, the gateway device 140 could transmit the data packets using an SDI cable to an SDI to HDMI converter, which could generate HDMI data for display (e.g., on display device 140).

Figure 2:
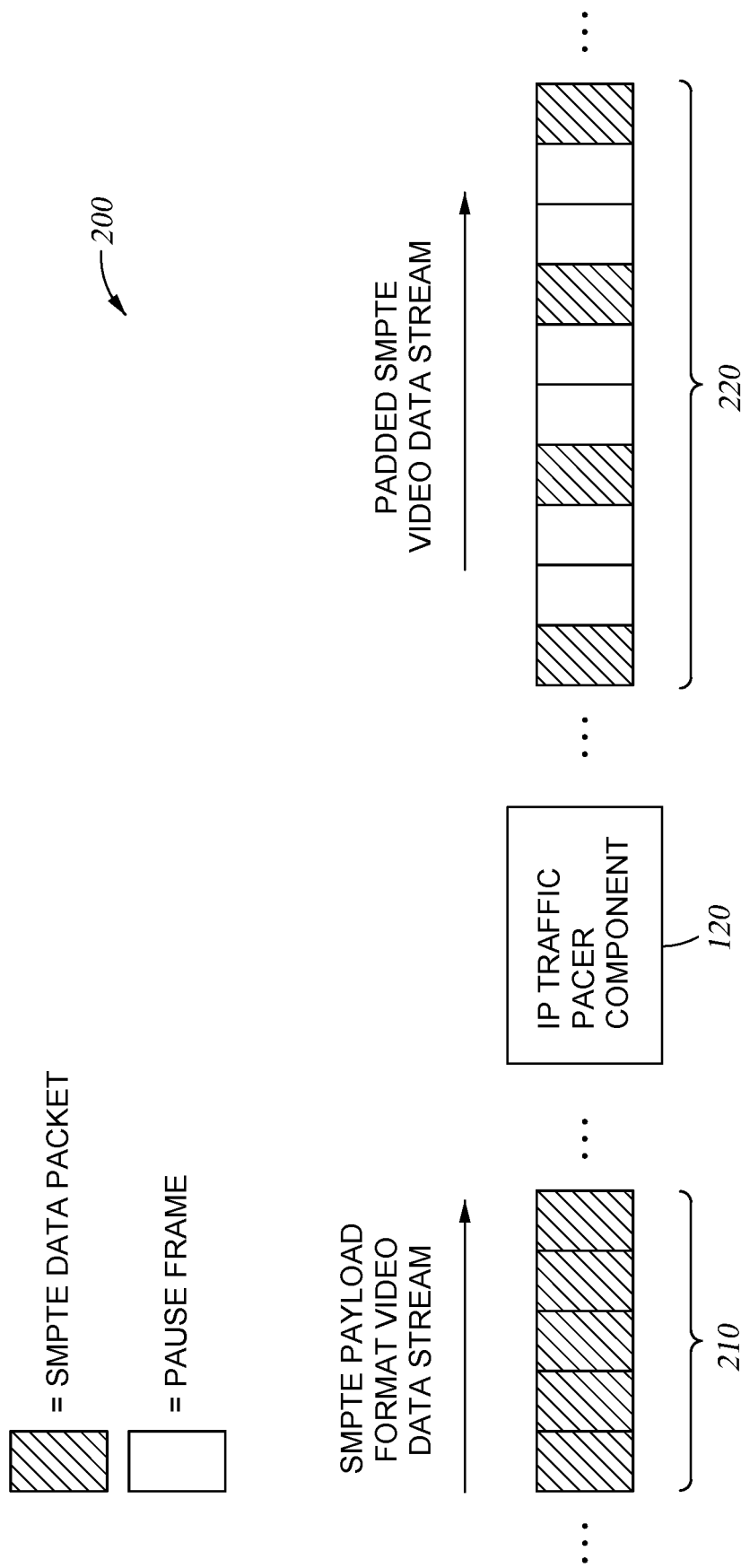
FIG. 2 is a diagram illustrating an IP traffic pacer component configured to pad a data stream of SMPTE data packets, according to one embodiment described herein.

FIG. 2 is a diagram illustrating an IP traffic pacer component configured to pad a data stream of SMPTE data packets, according to one embodiment described herein. As shown, the diagram 200 depicts an SMPTE payload format video data stream 210 containing a plurality of SMPTE data packets being transmitted to the IP traffic pacer component 120. As discussed above, the IP traffic pacer component 120 is generally configured to generate a padded SMPTE video data stream 220 by inserting a determined number of pause frames in between the SMPTE data packets. That is, rather than using a CPU or system-based time reference for pacing the transmittal of the SMPTE data packets to the gateway device 140, the IP traffic pacer component 120 is configured to use an Ethernet link of a known bandwidth (e.g., 10 Gbps) as a reference clock for pacing the data packets. For example, an Ethernet link of 10 Gbps takes 0.8 nanoseconds to transmit a byte of data on the wire. By controlling the data that passes across the Ethernet link, the IP traffic pacer component 120 can use the link as a 0.8 nanosecond reference clock. In an embodiment, the IP traffic pacer component 120 maintains full control over the Ethernet link used to transmit the SMPTE data packets, restricting any other data packets (e.g., data packets generated by other computing applications) from passing across the Ethernet link.

In the illustrated embodiment, SMPTE data packets are depicted as shaded boxes, while PAUSE frames are white. As illustrated, IP Traffic Pacer Component 120 has inserted two PAUSE frames between the SMPTE Data Packets to generate the padded SMPTE video data stream 220. In an embodiment, the number of PAUSE frames to insert into the SMPTE stream 210 to generate the padded stream 220 is determined by IP traffic pacer component 120 based at least in part on the desired rate of delivery for the gateway and/or the bandwidth of the Ethernet link. Similarly, in some embodiments, IP traffic pacer component 120 determines the size(s) of the PAUSE frames based at least in part on the desired rate of delivery, the bandwidth of the Ethernet link, or both. In a particular embodiment, the IP traffic pacer component 120 is configured to insert at least one PAUSE frame in between each of the SMPTE Data Packets to generate the padded SMPTE video data stream 220. In an embodiment, the PAUSE frames may not be the same size as an SMPTE data packet, nor the PAUSE frames may not be the same size as the other PAUSE frames inserted by IP traffic pacer component 120.

In an embodiment, to create the proper pacing for the SMPTE data packets, the IP traffic pacer component 120 can employ a stuffing approach, where the IP traffic pacer component 120 fills the NIC associated with the Ethernet link with a full 10 Gbps data stream. In one embodiment, such a stream comprises the padded SMPTE video data stream that includes the SMPTE data packets as well as a certain number of Institute of Electrical and Electronics Engineers (IEEE) 802.3 PAUSE frames with determined sizes. In other words, the IP traffic pacer component 120 can provide the NIC with sufficient data packets, such that the amount of physical network traffic generated by the NIC is always 10 Gbps of traffic, thus saturating the link. Of course, while the present examples are provided with respect to a 10 Gbps Ethernet link, more generally embodiments described herein can be adapted for use with Ethernet links of other sizes. For example, for a 1 Gbps Ethernet link, the IP traffic pacer component 120 could determine the amount of time it takes to send a byte of data across the link, and could insert a number of IEEE 802.3 PAUSE frames so as to saturate the link, while transmitting the SMPTE data packets to the gateway at the desired rate.

In one embodiment, the network switch 130 comprises a Cisco® Nexus 9K switch. Generally, the network switch 130 can be configured to drop any received IEEE 802.3 PAUSE frames. As a result, when the network switch 130 receives the padded SMPTE video data stream, the network switch 130 can drop the pause frames within the stream and can transmit the remaining SMPTE video data packets to the gateway device 140. As any phase jitter introduced by the network switch 130 is insignificant, doing so ensures that the gateway device 140 will receive the data packets with the timing imposed by the IP traffic pacer component 120. Thus, as a result, the gateway device 140 sees a paced CBR stream with IPG corresponding to the exact number of bytes in the 802.3 PAUSE frames that were originally inserted by the IP traffic pacer component 120 when generating the padded SMPTE video data stream 220.

In other words, the IP traffic pacer component 120 can use 802.3 PAUSE frames to implement the correct IPG between SMPTE data packets for the particular gateway device 140. In one embodiment, the desired rate of receiving SMPTE data packets at the gateway device 140 can be dynamically determined by the IP traffic pacer component 120. For example, the IP traffic pacer component 120 could determine a type of the gateway device 140 (e.g., by interacting with an Application Programming Interface (API) of the gateway device 140), and could determine the desired rate of receiving SMPTE data packets for the gateway device 140 based on the determined type (e.g., by accessing a remote directory using the determined type information).

In one embodiment, the IP traffic pacer component 120 can account for drift over time by controlling the sizes of the PAUSE frames inserted into the padded SMPTE video data stream. Generally, a standard NIC cannot saturate a link when sending a large number of small data packets. Accordingly, in one embodiment, the IP traffic pacer component 120 can be configured to use a predefined minimum size for the PAUSE frames. More generally, the IP traffic pacer component 120 can dynamically control the sizes of the PAUSE frames to ensure the link is saturated and to account for any drift over time.

In one embodiment, to compensate for the remaining drift, the IP traffic pacer component 120 is configured to implement a compensation feedback loop. For instance, the IP traffic pacer component 120 could employ a mechanism that provides a GAP command that takes a fractional number as a parameter. As an example, the IP traffic pacer component 120 could use the algorithm shown below in Psuedo-code 1.

```
State=0.0//This variable contains how many dummy
    bytes are yet to be sent. In some embodiments, this may
    be fractional.
//Algorithm works under the following assumptions:
    (Maximum     Transmission     Unit)
    MTU>2*MIN_PACKET_SIZE     and
    IPG>MIN_PACKET_SIZE
While (true) {
    If (state <1.0) {
        sendSMPTEPacket( )
        state+=IPG
    }else if (state>=MTU+MIN_PACKET_SIZE) {
        sendDummyPacketWithSize(MTU)
        state-=MTU
    }else if (state>=MTU and state<MTU+MIN_PACK-
        ET_SIZE) {
        sendDummyPacketWithSize(MIN_PACKET_SIZE)
        state-=MTU
    }else if (state<MTU) {
        sendDummyPacketWithSize(floor(state))//We can't
            send a fractional packet
        state-=floor(state)//We keep the fractional part of
            state for the next iteration
    }
}
```

Psuedo-Code 1—Compensation Feedback Loop

Generally, using the compensation feedback loop, the IP traffic pacer component 120 can ensure that the Ethernet link is completely saturated by using a minimum packet size for the data packets in the padded SMPTE video data stream 220, while accounting for any drift over time that would otherwise be incurred.

In one embodiment, the IP traffic pacer component 120 is configured to multiplex several SMPTE streams on a single Ethernet link (e.g., a 10 Gbps link), while maintaining required timing for the individual SMPTE streams. For example, such multiple streams could be distinct video streams, or the streams could be a SMPTE 2022-6 video data stream and a separate 2110-21 video data stream. Generally, in doing so, the IP traffic pacer component 120 can account for the desired rate of receiving data packets at one or more gateway devices 140 (e.g., the multiplexed streams could be transmitted to a respective gateway device 140, when inserting PAUSE frames of a determined size and number.

In a particular embodiment, the IP traffic pacer component 120 is configured to re-pace (i.e., re-building with proper timing) a SMPTE stream, which may have suffered from some phase jitter when travelling across switches and/or routers. For instance, the IP traffic pacer component 120 could receive the SMPTE payload format video data stream 210, after the data stream 210 has incurred some amount of phase jitter while passing across a number of other network devices. The IP traffic pacer component 120 could determine a desired rate of receiving SMPTE data packets for a gateway device 140, and could generate a padded SMPTE video data stream 220 that contains a number of IEEE 802.3 PAUSE frames determined to deliver the SMPTE data packets at the desired rate. The padded stream could be transmitted to a network switch configured to drop the pause frames, and the SMPTE data packets could then be delivered to the gateway device 140 at the proper pace. Doing so enables a SMPTE stream to be delivered to remote equipment using any kind of network tunnel (e.g., the Internet), while re-pacing the data packets using the IP traffic pacer component 120 prior to delivering them to a gateway device for consumption. Moreover, while the techniques described herein are described with respect to the delivery of SMPTE data packets, more generally the techniques for pacing data packets described herein can be adapted and applied to any kind of network traffic that uses a precise timing model.

Figure 3:
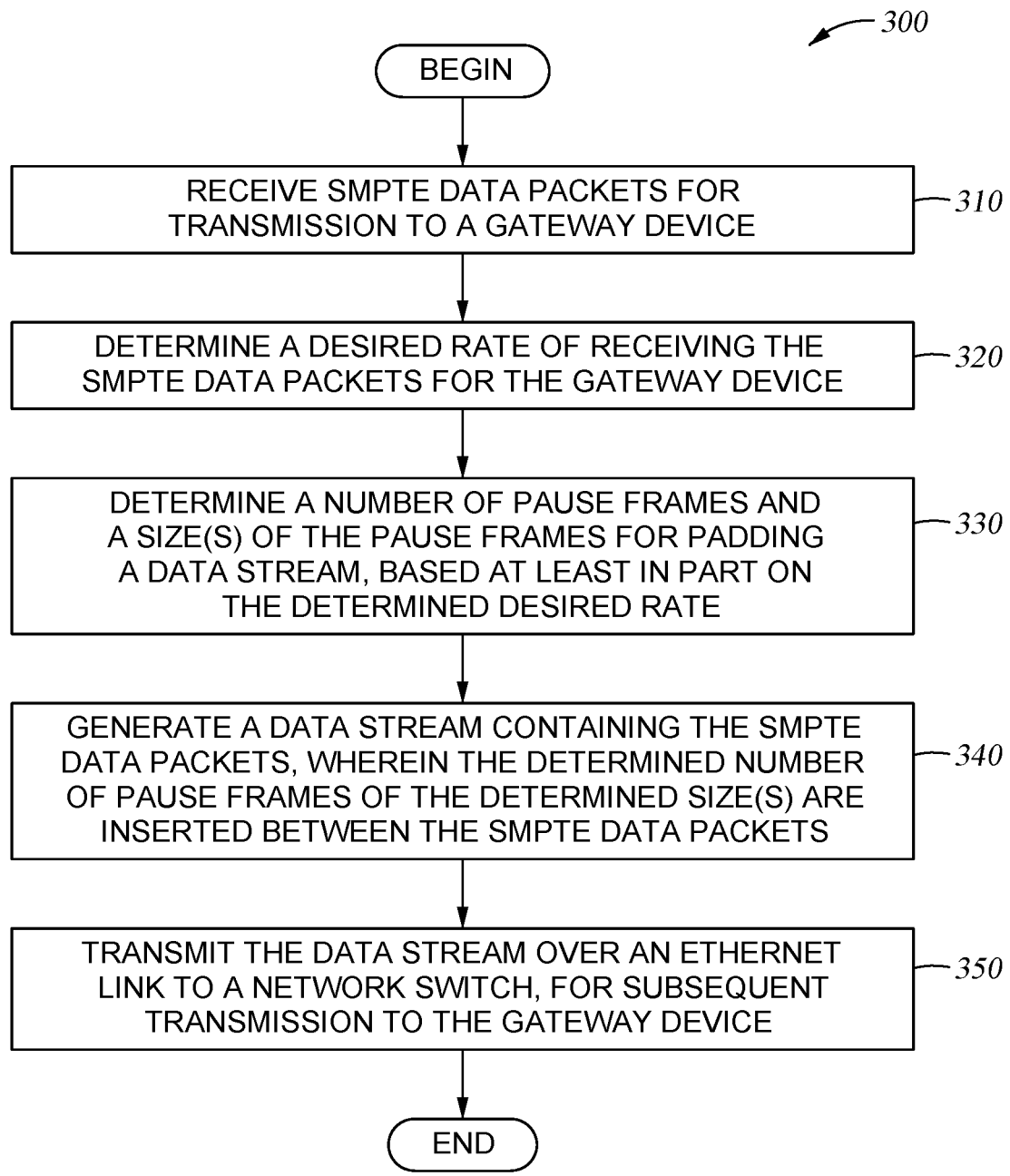
FIG. 3 is a flow diagram illustrating a method of generating a padded data stream of SMPTE data packets, according to one embodiment described herein.

FIG. 3 is a flow diagram illustrating a method of generating a padded data stream of SMPTE data packets, according to one embodiment described herein. As shown, the method 300 begins at block 310, where the IP traffic pacer component 120 receives SMPTE data packets for transmission to a gateway device. The IP traffic pacer component 120 determines a desired rate of receiving the SMPTE packets for the gateway device (block 320). Additionally, the IP traffic pacer component 120 determines a number of pause frames and a size(s) of the pause frames for padding a data stream, based at least in part on the determined desired rate (block 330).

The IP traffic pacer component 120 generates a data stream containing the SMPTE data packets, where the determined number of pause frames of the determined size(s) are inserted between the SMPTE data packets (block 340). The IP traffic pacer component 120 transmits the data stream over an Ethernet link to a network switch, for subsequent transmission to the gateway device (block 350), and the method 300 ends. For example, the network switch could be configured to drop received pause frames, and to transmit the SMPTE data packets on to the gateway device.

Figure 4:
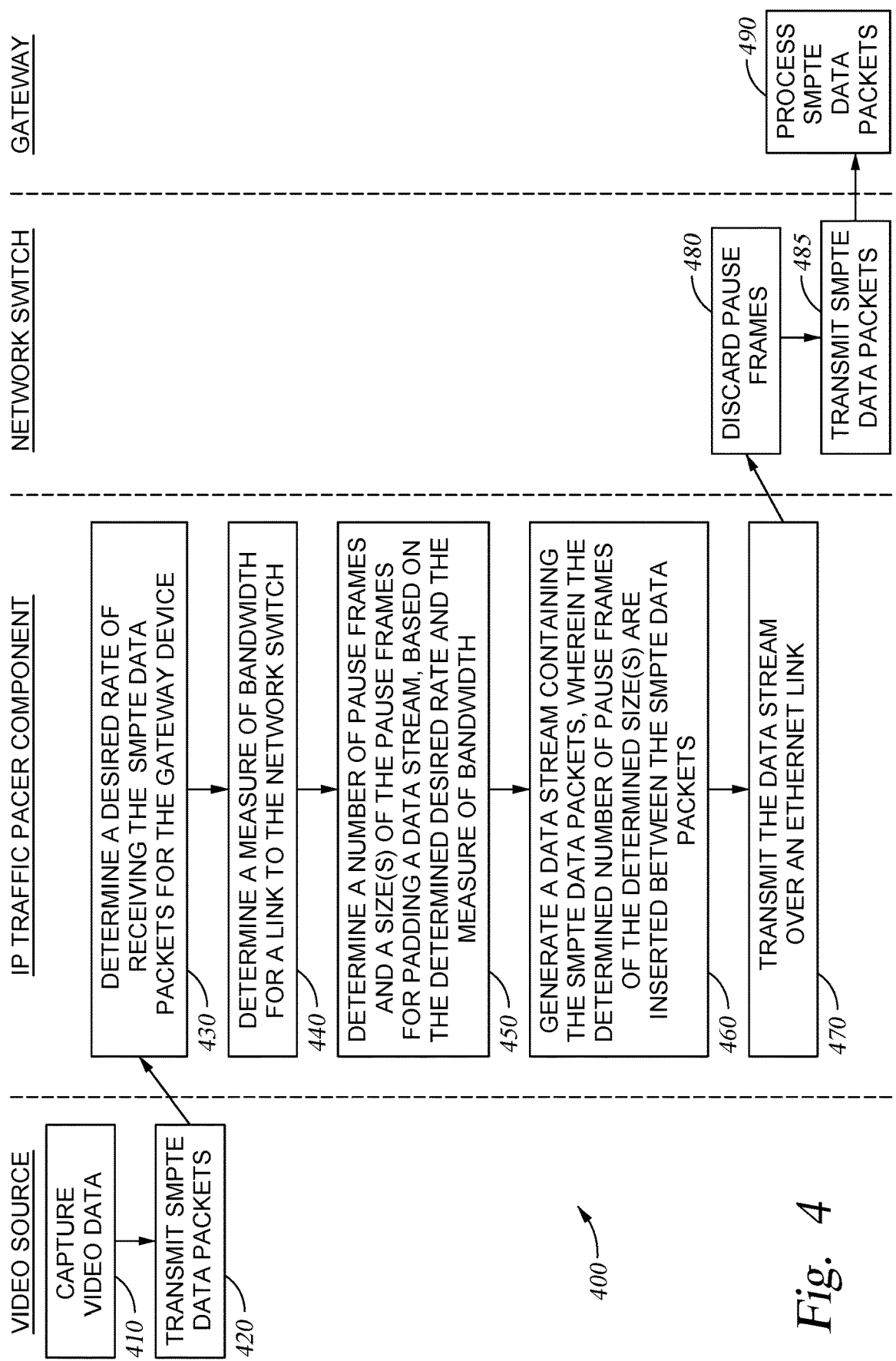
FIG. 4 is a flow diagram illustrating a method of using a padded data stream to control a pace for delivering SMPTE data packets, according to one embodiment described herein.

FIG. 4 is a flow diagram illustrating a method of using a padded data stream to control a pace for delivering SMPTE data packets, according to one embodiment described herein. As shown, the method 400 begins at block 410, where a video source captures video data. The video source then transmits SMPTE data packets containing the captured video data across an Ethernet link (block 420).

The IP traffic pacer component 120 receives the SMPTE data packets and determines a desired rate of receiving the SMPTE data packets for the gateway device (block 430). Additionally, the IP traffic pacer component 120 determines a measure of bandwidth for a link between the IP traffic pacer component 120 and the network switch (block 440). The IP traffic pacer component 120 determines a number of pause frames and a size(s) of the pause frames for padding a data stream, based at least in part on the determined desired rate and the measure of bandwidth (block 450).

The IP traffic pacer component 120 then generates a data stream containing the SMPTE data packets, where the determined number of pause frames of the determine size(s) are inserted between the SMPTE data packets (block 460).

The IP traffic pacer component 120 then transmits the generated data stream over an Ethernet link to the network switch (block 470).

Upon receiving the data stream, logic on the network switch is configured to automatically discard pause frames within the data stream (block 480). The network switch then transmits the SMPTE data packets to the gateway device at the desired rate (block 485). Upon receiving the SMPTE data packets, the gateway device processes the SMPTE data packets (block 490), and the method 400 ends.

Figure 5:
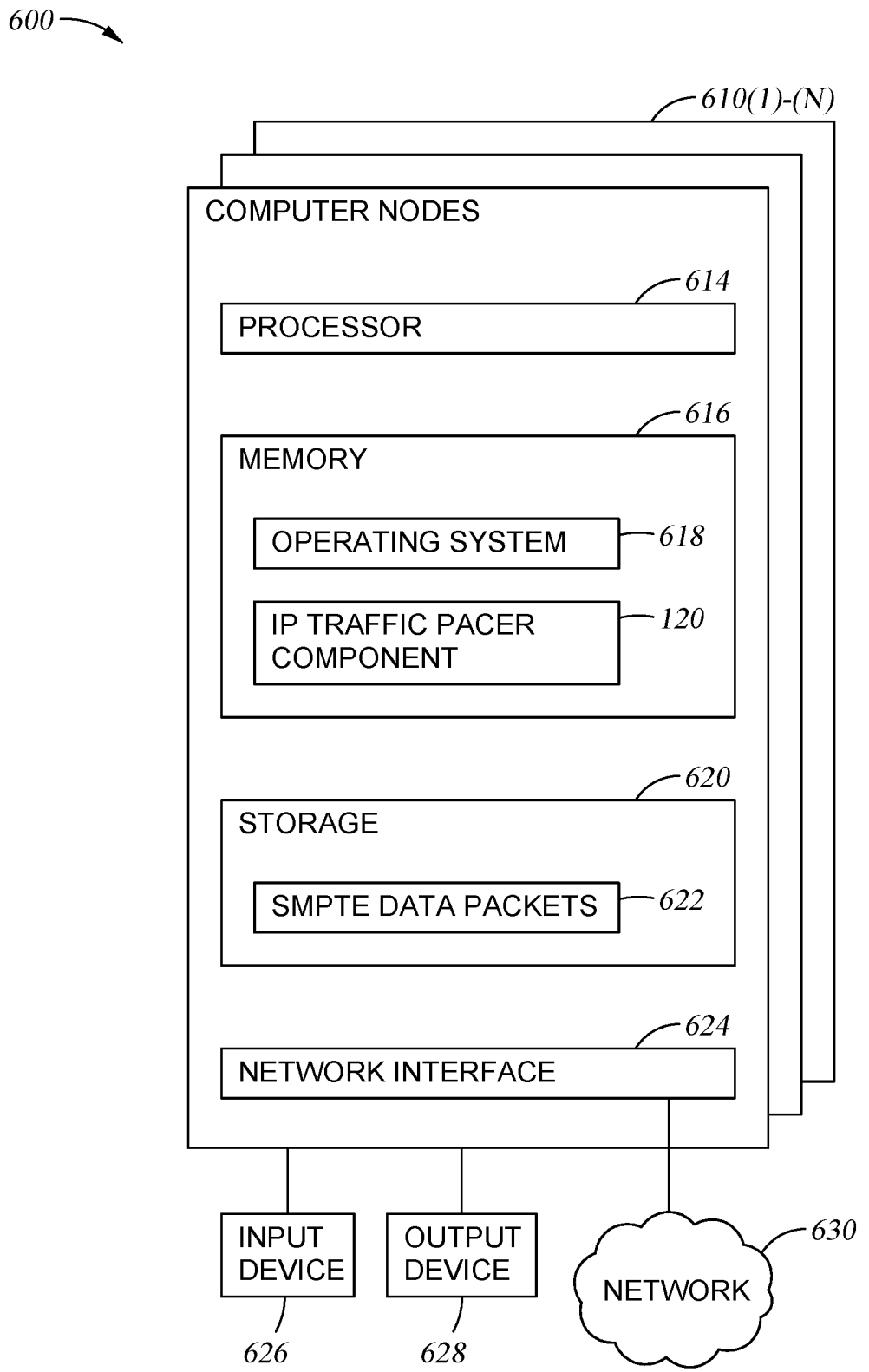
FIG. 5 is a block diagram illustrating a computing system configured with an IP traffic pacer component, according to one embodiment described herein.

FIG. 5 is a block diagram illustrating a computing system configured with an IP traffic pacer component, according to one embodiment described herein. The networked system 600 includes the compute nodes 610(1)-(N). The compute nodes 610(1)-(N) may also be connected to other computers and/or compute nodes $101_{1-N}$ via a network 630. In general, the network 630 may be a telecommunications network and/or a wide area network (WAN). In a particular embodiment, the network 630 is the Internet.

The compute nodes 610(1)-(N) generally include a processor 614 which obtains instructions and data via a bus (not shown) from a memory 616 and/or a storage device 620. The compute nodes 610(1)-(N) also include one or more network interface devices 624, input devices 626, and output devices 628 connected to the bus. The compute nodes 610(1)-(N) are generally under the control of an operating system 618. Any operating system 618 supporting the functions disclosed herein may be used. The processor 614 is a programmable logic device that performs instruction, logic, and mathematical processing, and may be representative of one or more CPUs. The network interface device 624 may be any type of network communications device allowing the compute nodes 610(1)-(N) to communicate with other computers via the network 630.

The storage 620 is representative of hard-disk drives, solid state drives, flash memory devices, optical media and the like. Generally, the storage 620 stores application programs and data for use by the compute nodes 610(1)-(N). For example, the storage 620 is depicted as containing received SMPTE data packets 622. Of course, one of ordinary skill in the art will appreciate that all or part of the SMPTE data packets 622 can also be stored in the memory 616, in addition to or instead of the storage 620. In addition, the memory 616 and the storage 620 may be considered to include memory physically located elsewhere; for example, on another computer coupled to the computer via the bus.

The input device 626 may be any device capable of providing input to the compute node 610(1)-(N). For example, a keyboard and/or a mouse may be used. The input device 626 represents a wide variety of input devices, including keyboards, mice, controllers, and so on. Furthermore, the input device 626 may include a set of buttons, switches or other physical device mechanisms for controlling the computer 602. The output device 628 may include output devices such as monitors, touch screen displays, and so on.

As shown, the memory 616 contains the IP traffic pacer component 120. In one embodiment, the IP traffic pacer component 120 is configured to facilitate the delivery of a paced stream of SMPTE video data packets to a gateway device. For example, the IP traffic pacer component 120 could receive (e.g., using a first network interface 624) a data stream of video data packets, represented by the SMPTE data packets 622 in the system 600. The IP traffic pacer component 120 could determine a desired rate of delivery for the video data packets at a gateway device. The IP traffic pacer component 120 could generate a padded data stream by inserting one or more pause frames in between the video data packets in the received data stream, based on the desired rate of delivery. The IP traffic pacer component 120 could then transmit the padded data stream across a link (e.g., using a second network interface 624) to a network switch, where the network switch could be configured to drop any pause frames within the stream and to transmit the SMPTE data packets to the gateway device at the desired rate.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving a data stream comprising a plurality of video data packets;
determining a first rate of delivery for the plurality of video data packets at a gateway device;
identifying a network property of a link to a network switch communicatively coupled to the gateway device;
pacing transmission of the plurality of video data packets to the network switch by generating a padded data stream comprising a plurality of internet protocol (IP) packets by inserting one or more pause frames in between the plurality of video data packets in the received data stream, wherein a number of the pause frames, a size of at least one of the pause frames, or both, is based on the first rate of delivery at the gateway device and the network property of the link to the network switch; and
transmitting the padded data stream across the link to the network switch at a second transmission rate that differs from the first rate of delivery to the gateway device, wherein the network switch is configured to receive the padded data stream at the second transmission rate, and discard at least one of the one or more pause frames to deliver the plurality of video data packets to the gateway device at the first rate of delivery.

2. The method of claim 1, the method further comprising:
determining a measure of bandwidth for the link to the network switch, wherein the network property of the link to the network switch is the measure of bandwidth.

3. The method of claim 2, the method further comprising:
determining a size of a first pause frame of the one or more pause frames based on the first rate of delivery for the plurality of video data packets and the determined measure of bandwidth, wherein the size of the first pause frame is greater than a size of a second pause frame of the one or more pause frames.

4. The method of claim 3, wherein the size of at least one of the one or more pause frames is determined based further on a predefined minimum size.

5. The method of claim 1, wherein determining the first rate of delivery for the plurality of video data packets at the gateway device comprises interacting with an application programming interface (API) of the gateway device.

6. The method of claim 1, wherein the plurality of video data packets are formatted according to a Society of Motion Picture and Television Engineers (SMPTE) standard.

7. The method of claim 6, wherein the SMPTE standard further comprises one of SMPTE 2022-6 or SMPTE 2110-21.

8. The method of claim 1, wherein the generating the padded data stream uses a network transmission link as a reference clock.

9. The method of claim 8, wherein the network transmission link is an Ethernet link and wherein a speed of the reference clock is based on bandwidth of the Ethernet link.

10. The method of claim 9 wherein the number of the pause frames, the size of the at least one of the pause frames, or both, is based on the speed of the reference clock.

11. A system that includes:
an Internet Protocol (IP) traffic pacer component;
a network switch; and
a gateway device;
wherein the IP traffic pacer component comprises a first processor and a first memory element storing data, which, when executed on the first processor, performs a first operation comprising:
receiving a data stream of a plurality of video data packets;
determining a first rate of delivery for the plurality of video data packets at the gateway device;
identifying a network property of a link to the network switch, wherein the network switch is communicatively coupled to the gateway device;
pacing transmission of the plurality of video data packets to the network switch by generating a padded data stream comprising a plurality of internet protocol (IP) packets by inserting one or more pause frames in between the plurality of video data packets in the received data stream, wherein a number of the pause frames, a size of at least one of the pause frames, or both, is based on the first rate of delivery and the network property of the link to the network switch;
transmitting the padded data stream across the link to the network switch at a second transmission rate that differs from the first rate of delivery to the gateway device;
wherein the network switch comprises a second processor and a second memory element storing data, which, when executed on the second processor, performs a second operation comprising:
receiving the padded data stream across the link; and
discarding the one or more pause frames within the padded data stream prior to transmitting the plurality of video data packets to the gateway device at the first rate of delivery; and
wherein the gateway device comprises a third processor and a third memory element storing data, which, when executed on the third processor, performs a third operation comprising:
receiving the plurality of video data packets at the first rate of delivery; and
processing the plurality of received video data packets.

12. The system of claim 11, wherein the first operation further comprises:
determining a measure of bandwidth for the link to the network switch, wherein the network property of the link to the network switch is the measure of bandwidth.

13. The system of claim 11, wherein the IP traffic pacer component maintains full control of the link.

14. The system of claim 11, wherein the one or more pause frames are inserted in between the plurality of video data packets in the received data stream in order to saturate the link.

15. The system of claim 11, wherein the plurality of video data packets are formatted according to a Society of Motion Picture and Television Engineers (SMPTE) standard.

16. The system of claim 15, wherein the SMPTE standard further comprises one of SMPTE 2022-6 or SMPTE 2110-21.

17. A method comprising:
receiving a data stream comprising a plurality of video data packets, wherein the plurality of video data packets are formatted according to a Society of Motion Picture and Television Engineers (SMPTE) standard;
determining a first rate of delivery of the plurality of video data packets at a gateway device;
identifying a network property of a link to a network switch communicatively coupled to the gateway device, the network property comprising a measure of bandwidth for the link to the network switch;
determining a number of pause frames to insert between the plurality of video data packets in the padded data stream based on the network property of the link to the network switch;
determining a size of at least one of the determined number of pause frames based on the first rate of delivery for the plurality of video data packets;
pacing transmission of the plurality of video data packets to the network switch by generating a padded data stream comprising a plurality of internet protocol (IP) packets by inserting the determined number of pause frames of the determined size between the plurality of video data packets in the received data stream based on the first rate of delivery; and
transmitting the padded data stream across the communications link to the network switch at a second transmission rate that differs from the first rate of delivery to the gateway device, wherein the network switch is configured to receive the padded data stream at the second transmission rate, and discard at least one of the pause frames to deliver the plurality of video data packets to the gateway device at the first rate of delivery.

18. The method of claim 17, wherein a size of a first one of the plurality of data packets is greater than a size of a second one of the plurality of data packets.

19. The method of claim 17, wherein the SMPTE standard further comprises one of SMPTE 2022-6 or SMPTE 2110-21.

* * * * *